UNITED STATES PATENT OFFICE.

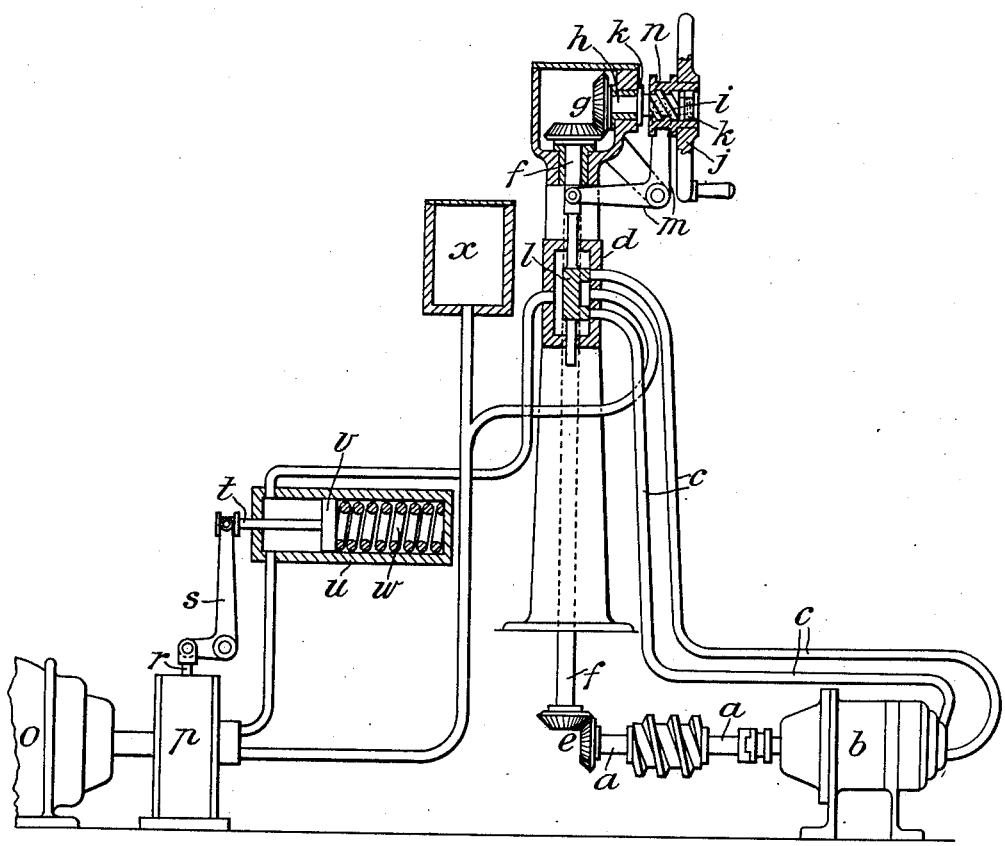

FRANCIS FEE, OF NEWCASTLE-UPON-TYNE, ENGLAND, ASSIGNOR TO SIR W. G. ARMSTRONG, WHITWORTH AND COMPANY, LIMITED, OF NEWCASTLE-UPON-TYNE, ENGLAND.

DEVICE FOR CONTROLLING POWER-OPERATING MECHANISM.

1,359,679.      Specification of Letters Patent.      Patented Nov. 23, 1920.

Application filed April 15, 1919. Serial No. 290,242.

*To all whom it may concern:*

Be it known that I, FRANCIS FEE, a subject of the King of Great Britain, residing at Elswick Works, Newcastle-upon-Tyne, England, have invented a new and useful Improvement in Devices for Controlling Power-Operating Mechanism, of which the following is a specification.

This invention relates to improved means for controlling the supply of liquid under pressure to mechanism operated thereby.

The invention is illustrated by the accompanying drawing.

$a$ is a worm shaft which can be actuated by an engine $b$ to which liquid under pressure is supplied by pipes $c, c$, leading from a valve casing $d$. The shaft $a$ is geared by bevel gear $e$, a spindle $f$, and bevel gear $g$, to a spindle $h$, on which is a quick thread $i$ meshing with a similar thread cut in the interior of the boss of a handwheel $j$. Collars $k, k$, limit the movement of the handwheel along the spindle. A control valve $l$ in the casing $d$ is actuated by a bell crank $m$ on which is a roller working in a groove $n$ cut around the boss of the wheel $j$.

$o$ is an electric motor driving a pump $p$, the amount of liquid delivered by which can be varied in well known manner by the movement of rod $r$ connected by a lever $s$ to the piston rod $t$ of an accumulator $u$, the rear of the piston $v$ being loaded by means of a spring $w$ which tends to keep the amount of liquid delivered by the pump at a maximum. When the electric motor is started, liquid is pumped from a tank $x$ to the accumulator $u$; this forces in the piston $v$ and centers the pump, the liquid being then stored in the accumulator at a pressure determined by the strength of the spring.

The first movement of the wheel $j$ moves the valve $l$ admitting liquid from the accumulator to the engine $b$, turning the shaft $a$. This supply of pressure from the accumulator causes its piston to be moved forward therein by the spring and fixes the amount of liquid delivered by the pump so as to supply just the amount of liquid required for the necessary speed of revolution of the shaft $a$, which speed is determined by the rate at which the handwheel $j$ is turned. If the wheel continues to be turned, its movement assists through spindle $f$ the power of the engine.

On the handwheel being held from rotating the motion of the spindle $h$ is continued until the handwheel is thereby moved to the center of its axial travel, thereby closing the valve and causing the engine $b$ to come to rest. The pump continues to deliver liquid until such a time as the pressure in the accumulator is sufficient to force the piston $v$ back and restore the condition in which the delivery of the pump is a minimum.

Should it be required to turn the shaft $a$ for some time, the handwheel may be released while the valve is open and the motion will continue until the handwheel, the motion of which will continue under these conditions, is stopped. Should the power fail, the shaft $a$ may be turned by turning the handwheel.

What I claim is:—

1. The combination of an hydraulic engine, a valve adapted to control the supply of liquid thereto, a spindle geared to the engine shaft, a handle adapted to rotate the spindle and to move axially along it and means whereby such axial movement of the handle actuates the valve.

2. The combination of an hydraulic engine, a valve adapted to control the supply of liquid thereto, a spindle geared to the engine shaft, a screw thread on the spindle, a handle having in it a thread meshing with the first thread, means for limiting the movement of the handle along the spindle and means whereby such movement of the handle actuates the valve.

3. The combination of an hydraulic engine, a valve adapted to control the supply of liquid thereto, a spindle geared to the engine shaft, a handle adapted to rotate the spindle and to move axially along it, means whereby such axial movement of the handle actuates the valve, a pump adapted to deliver liquid under pressure to the valve and means for driving the pump.

4. The combination of an hydraulic engine, a valve adapted to control the supply of liquid thereto, a spindle geared to the engine shaft, a handle adapted to rotate the spindle and to move axially along it, means whereby such axial movement of the handle actuates the valve, an accumulator connected to the valve, a pump adapted to deliver liquid under pressure to the accumulator and means for driving the pump.

5. The combination of an engine operated by fluid pressure, a valve adapted to control the supply of liquid to the engine, a rod geared to the engine and adapted to turn therewith, a spindle arranged at right angles to the rod and which is geared thereto, a handle for rotating the spindle and which moves axially along it, and connections between the handle and the valve whereby the axial movement of the handle actuates the valve.

In testimony that I claim the foregoing as my invention, I have signed my name this 18th day of March, 1919.

FRANCIS FEE.